US010826663B2

(12) United States Patent
Yi et al.

(10) Patent No.: US 10,826,663 B2
(45) Date of Patent: Nov. 3, 2020

(54) SYSTEM AND METHOD FOR DETERMINING A PILOT SIGNAL

(71) Applicant: Huawei Technologies Co., Ltd., Shenzhen (CN)

(72) Inventors: Zhihang Yi, Ottawa (CA); Jianglei Ma, Ottawa (CA); Liqing Zhang, Ottawa (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 690 days.

(21) Appl. No.: 13/798,297

(22) Filed: Mar. 13, 2013

(65) Prior Publication Data

US 2014/0269520 A1 Sep. 18, 2014

(51) Int. Cl.
*H04L 5/00* (2006.01)
*H04L 27/26* (2006.01)

(52) U.S. Cl.
CPC .......... *H04L 5/0051* (2013.01); *H04L 5/0048* (2013.01); *H04L 27/2602* (2013.01)

(58) Field of Classification Search
CPC . H04L 25/0228; H04L 5/0016; H04L 27/262; H04L 25/0226; H04L 27/2657; H04L 27/2662; H04L 27/2613; H04L 5/005; H04L 5/0007; H04L 2025/03802; H04L 5/0026; H04L 5/0023; H04L 25/025; H04L 27/2647; H04L 25/0212; H04L 25/0224; H04W 72/04; H04W 52/325; H04B 7/0669; H04B 7/0848
See application file for complete search history.

(56) References Cited

U.S. PATENT DOCUMENTS

| 7,912,115 | B2 | 3/2011 | Zhao et al. |
| 8,576,822 | B2 * | 11/2013 | Yoon ............ H04L 5/0023 370/342 |
| 2001/0022558 | A1 * | 9/2001 | Karr et al. ............ 342/450 |
| 2006/0146948 | A1 | 7/2006 | Park et al. |

(Continued)

FOREIGN PATENT DOCUMENTS

| CN | 1833387 A | 9/2006 |
| CN | 1859056 A | 11/2006 |

(Continued)

OTHER PUBLICATIONS

International Search Report and Written Opinion, International Application No. PCT/CN2014/073324, Applicant: Huawei Technologies Co., Ltd., dated Jul. 9, 2014, 13 pgs.

(Continued)

*Primary Examiner* — Marsha D Banks Harold
*Assistant Examiner* — Dharmesh J Patel
(74) *Attorney, Agent, or Firm* — Slater Matsil, LLP

(57) ABSTRACT

A method of configuring a pilot signal includes defining a first pilot signal arrangement and defining a second pilot signal arrangement. Also, the method includes determining, by a communications controller, a first determined pilot signal arrangement in accordance with the first defined pilot signal arrangement, the second defined pilot signal arrangement, and a set of characteristics and transmitting, by the communications controller, the pilot signal having the first determined pilot signal arrangement.

20 Claims, 7 Drawing Sheets

(56) References Cited

U.S. PATENT DOCUMENTS

| | | |
|---|---|---|
| 2006/0172704 A1 | 8/2006 | Nishio et al. |
| 2006/0209732 A1 | 9/2006 | Gorokhov et al. |
| 2008/0151806 A1* | 6/2008 | Bereski et al. ............... 370/312 |
| 2008/0219235 A1* | 9/2008 | Ma ........................ H04L 5/0051 370/344 |
| 2008/0225960 A1* | 9/2008 | Kotecha ............... H04B 7/0413 375/259 |
| 2008/0232504 A1 | 9/2008 | Ma et al. |
| 2009/0052470 A1* | 2/2009 | Yun et al. ..................... 370/491 |
| 2009/0213750 A1 | 8/2009 | Gorokhov et al. |
| 2009/0276674 A1* | 11/2009 | Wei et al. ..................... 714/749 |
| 2009/0296563 A1* | 12/2009 | Kishiyama ............. H04J 13/00 370/210 |
| 2010/0002787 A1* | 1/2010 | Choi ..................... H04L 5/0023 375/260 |
| 2010/0150000 A1* | 6/2010 | Sakata ......................... 370/252 |
| 2010/0246527 A1* | 9/2010 | Montojo ............... H04L 5/0051 370/330 |
| 2010/0266060 A1 | 10/2010 | Kimura et al. |
| 2011/0075625 A1* | 3/2011 | Nystrom ............... H04L 5/0048 370/329 |
| 2011/0261781 A1* | 10/2011 | Vrzic et al. |
| 2012/0087028 A1 | 4/2012 | Cook |
| 2013/0021964 A1 | 1/2013 | Shen et al. |
| 2013/0128932 A1* | 5/2013 | Huang .................. H04L 5/0048 375/219 |
| 2014/0016622 A1* | 1/2014 | Bao et al. ..................... 370/336 |
| 2014/0161068 A1 | 6/2014 | Vrzic et al. |
| 2014/0334527 A1 | 11/2014 | Van De Beek et al. |
| 2017/0078068 A1 | 3/2017 | Nishio et al. |

FOREIGN PATENT DOCUMENTS

| | | |
|---|---|---|
| CN | 101415227 A | 4/2009 |
| CN | 102057702 A | 5/2011 |
| CN | 102195906 A | 9/2011 |
| CN | 102379098 A | 3/2012 |
| CN | 102739382 A | 10/2012 |
| EP | 2690899 A1 | 1/2014 |
| JP | 2008547252 A | 12/2008 |
| KR | 20120043140 A | 5/2012 |
| WO | 2005015797 | 2/2005 |
| WO | 2008016325 A2 | 2/2008 |

OTHER PUBLICATIONS

Afifi, Wessam M., et al., "A New Adaptive Channel Estimation for Frequency Selective Time Varying Fading OFDM Channels," ICCES International Conference on Computer Engineering & Systems, Dec. 14-16, 2009, pp. 573-578.

Dowler, Alex, et al., "Performance Evaluation of Channel Estimation Techniques for a Mobile Fourth Generation Wide Area OFDM System," Vehicular Technology Conference, Fall 2002, 5 pages.

Guey, Jiann-Ching, et al., "Adaptive Pilot Allocation in Downlink OFDM," IEEE Wireless Communications Networking Conference, Mar. 31-Apr. 3, 2008, 6 pages.

Sabooniha, Babak, et al., "A New Scheme of Pilot Arrangement in OFDM Systems by Using a Feedback Branch," 18$^{th}$ Telecommunications forum TELFOR, Nov. 23-25, 2010, pp. 388-391.

Simeone, O., et al., "Adaptive Pilot Pattern for OFDM Systems," IEEE Communications Society, Jun. 20, 2004, pp. 978-982.

China Telecom, "Discussion on spectral efficiency improvement for small cell enhancements," 3GPP TSG RAN WG1 Meeting, #72, R1-130354, St. Julian's, Malta, Jan. 28-Feb. 1, 2013, 6 pgs.

Nokia, et al., "Evaluation Assumptions on Schemes to Enhance Small Cell Spectral Efficiency," 3GPP TSG RAN WG1 Meeting, #72, R1-130491, St. Julian's, Malta, Jan. 28-Feb. 1, 2013, 4 pgs.

3GPP TS 36.211 V11.0.0 (Sep. 2012),3rd Generation Partnership Project;Technical Specification Group Radio Access Network;Evolved Universal Terrestrial Radio Access (E-UTRA);Physical Channels and Modulation(Release 11),total 106 pages.

Samsung, "Adaptive Cyclic Delay Diversity", 3GPP TSG RAN WG1 Meeting #43, R1-051354, Nov. 7-11, 2005, 11 pages, Seoul, Korea.

LG Electronics et al., "CDD-based Precoding for E-UTRA downlink MIMO", 3GPP TSG RAN WG1 Meeting #47, R1-063345, Nov. 6-10, 2006, 6 pages, Riga, Latvia.

* cited by examiner

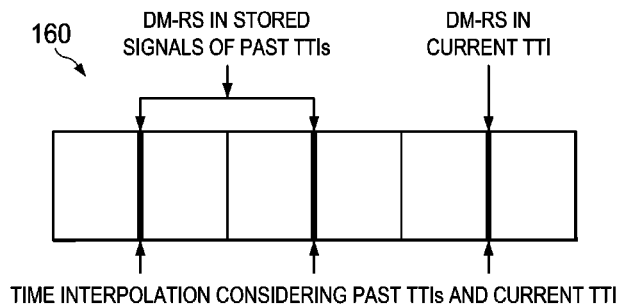
FIG. 9
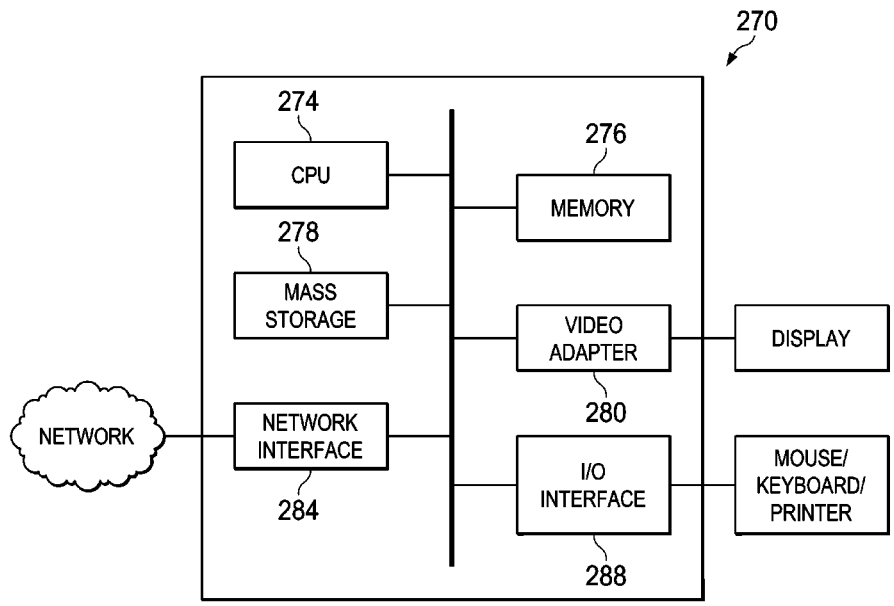
FIG. 10
FIG. 11

SYSTEM AND METHOD FOR DETERMINING A PILOT SIGNAL

TECHNICAL FIELD

The present invention relates generally to telecommunications, and in particular, to a system and a method for determining a pilot signal.

BACKGROUND

A long-term evolution (LTE) system, marketed as 4G LTE, is a standard for high speed wireless communications for mobile phones and data terminals. LTE is based on Global System for Mobile Communications (GSM) Enhanced Data Rates for GSM Evolution (EDGE) and Universal Mobil Telecommunications System (UMTS) High Speed Network Access (HSPA) network technologies. An LTE system has an increased capacity and speed. The LTE system uses a different radio interface with core network improvements, such as using new digital signal processing (DSP) techniques. LTE is developed by the $3^{rd}$ Generation Partnership Project (3GPP). The LTE system has a high spectral efficiency, very low latency, supports variable bandwidth, and has a simple architecture.

In telecommunications systems, such as an LTE system, a pilot signal or demodulation reference signal (DMRS) is a signal, usually having a single frequency, transmitted over a communications system for supervision, control, equalization, continuity, synchronization, or reference purposes.

SUMMARY OF THE INVENTION

In accordance with an embodiment, a method of configuring a pilot signal includes defining a first pilot signal arrangement and defining a second pilot signal arrangement. Also, the method includes determining, by a communications controller, a first determined pilot signal arrangement in accordance with the first defined pilot signal arrangement, the second defined pilot signal arrangement, and a set of characteristics and transmitting, by the communications controller, the pilot signal having the first determined pilot signal arrangement.

In accordance with another embodiment of the present invention, a method of configuring a pilot signal includes defining a first pilot signal arrangement and defining a second pilot signal arrangement. Also, the method includes determining, by a user equipment, a first determined pilot signal arrangement in accordance with the first defined pilot signal arrangement, the second defined pilot signal arrangement, and a set of characteristics and communicating, by the user equipment, the pilot signal having the first determined pilot signal arrangement.

In a further embodiment of the present invention, a method of configuring a pilot signal includes receiving, by a node, a set of characteristics and determining a frequency domain density of the pilot signal in accordance with the set of characteristics, a first pilot signal arrangement, and a second pilot signal arrangement. Also, the method includes communicating, by the node, the pilot signal at the determined frequency domain density.

In an additional embodiment, a method of configuring a pilot signal includes receiving, by a node, a set of characteristics and determining a time domain density of the pilot signal in accordance with the set of characteristics a first pilot signal arrangement, and a second pilot signal arrange-ment. Also, the method includes communicating, by the node, the pilot signal at the determined time domain density.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 9 illustrates a table for an embodiment method of determining a pilot signal arrangement;

FIG. 10 illustrates time interpolation for TTIs; and

FIG. 11 illustrates a schematic diagram of an embodiment of a general-purpose computer system.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a legacy LTE system, there is a fixed pilot density that consumes about 7% or 14% of download resources, which is a significant amount of resources. A variable pilot density generally should consume fewer download resources.

Figure 1:
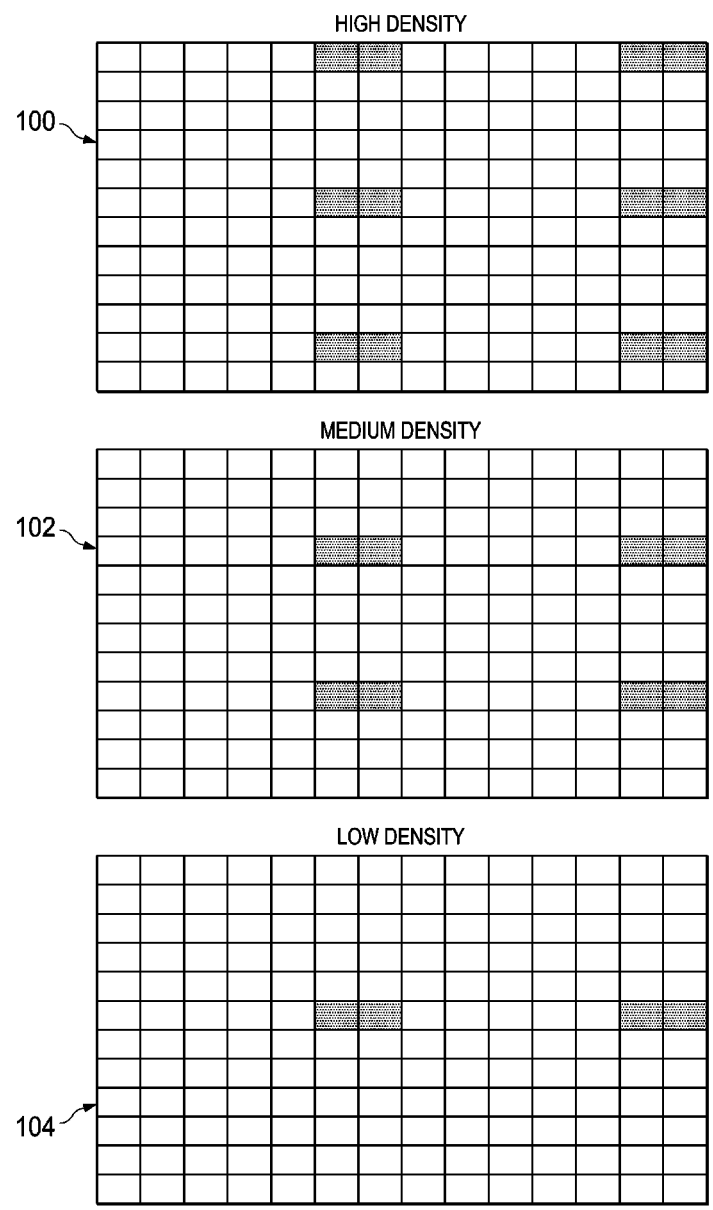
FIG. 1 illustrates three frequency domain densities of pilot signals.
Figure 2:
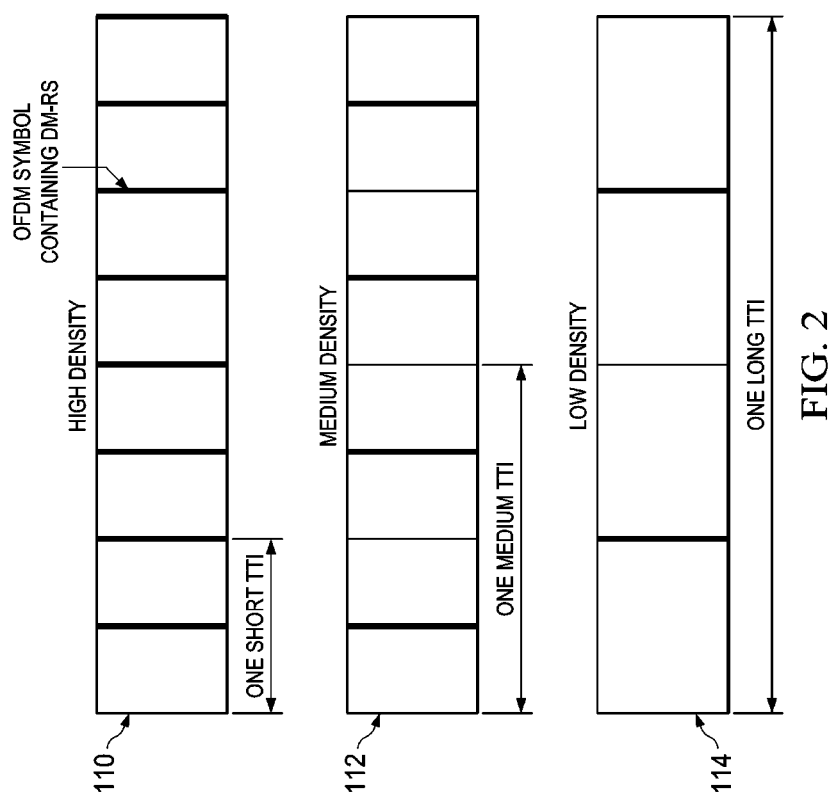
FIG. 2 illustrates three time domain densities of pilot signals.

FIG. 1 illustrates three examples of pilot densities in the frequency domain, where the x axis represents time and the y axis represents frequency. The dark blocks represent the symbols that the pilot is being transmitted on. High frequency density 100 has a density of 3/12 orthogonal frequency division multiplexing (OFDM) tones, medium density 102 has a density of 2/12 OFDM tones, and low density 104 has a density of 1/12 OFDM tones. Similarly, FIG. 2 illustrates three examples of pilot densities in the time domain. High time density 110 has a density of 4/14 OFDM symbols, medium time density 112 has a density of 2/14 OFDM symbols, and low density 114 has a density of 1/14 OFDM symbols.

In an example, the pilot density in the frequency domain and/or in the time domain is independently determined by both a communication controller and a user equipment using the same criteria, so they determine the same pilot density. The pilot density of the communication controller and user equipment may be determined without communicating the pilot density between the communication controller and the user equipment. Characteristics used to determine the pilot density may be communicated between the communication controller and the user equipment.

A communication controller may be a device configured to regulate the communications occurring in a communications system. Examples of communications controllers include an evolved nodes B (eNB), a switch coupled to and controlling the eNBs, a base station, a transmit point, a remote radio head, a communications controller, a controller, and the like. Also, examples of user equipment include a mobile station, a subscriber, a user, a terminal, a phone, and the like.

Figure 3:
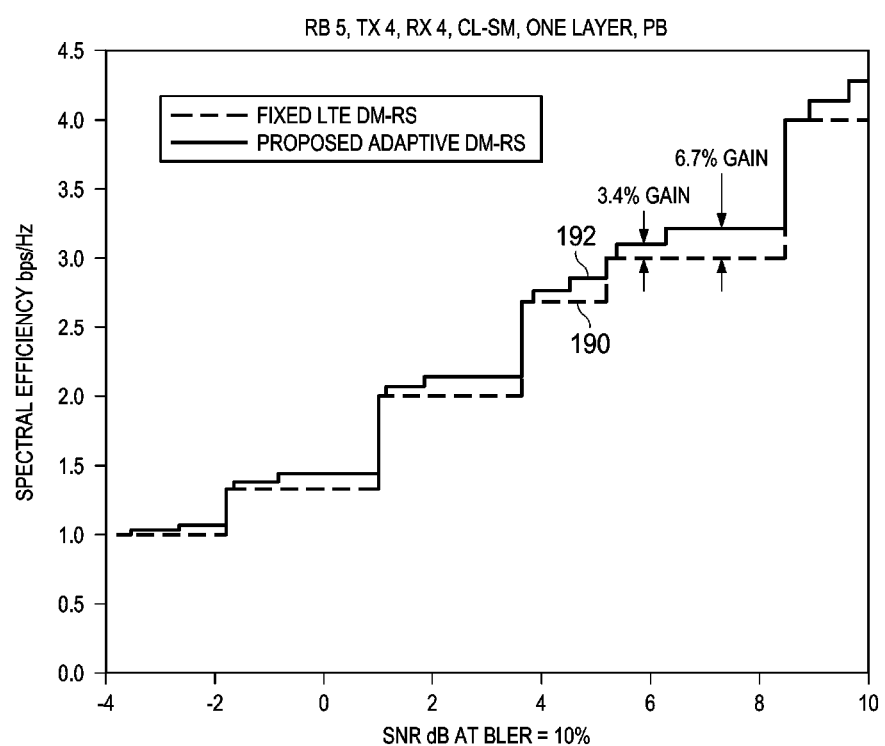
FIG. 3 illustrates a graph of spectral efficiency versus SNR.

Adaptive pilot density generally will reduce the pilot density. By reducing the pilot density in the time and frequency domains, more resource elements (REs) may be used for data transmission. Thus, better throughput and spectral efficiency may be achieved. FIG. 3 illustrates a graph of spectral efficiency versus signal to noise ratio (SNR). In the example depicted in FIG. 3, there are 5 resource blocks (RBs), 4 communication controller antennas, 4 user equipment antennas, closed loop spatial multiplexing (CLSM), one layer, and pedestrian type B (PB) channel. Curve 190 illustrates the spectral efficiency for a system with a fixed pilot density, while curve 192 illustrates spectral efficiency for a system with adaptive pilot density. Table 1 below illustrates the pilot density gains from an adaptive pilot density compared to a fixed pilot density in the time and frequency domain. The baseline is a high time density and a high frequency density. For a high pilot density in the frequency domain, there is a 0.0% gain with a high pilot density in the time domain, a 12.1% gain for a medium pilot density in the time domain, and an 18.1% gain for a low pilot density in the time domain. Also, for a medium pilot density in the frequency domain, there is a 3.4% gain for a high pilot density in the time domain, a 13.8% gain for a medium pilot density in the time domain, and a 19.1% gain for a low pilot density in the time domain. Further, for a low pilot density in the frequency domain, there is a 6.9% gain for a high pilot density in the time domain, a 15.5% gain for a medium pilot density in the time domain, and a 19.8% gain for a low pilot density in the time domain density.

TABLE 1

Pilot density Gains

| | | Time domain density | | |
|---|---|---|---|---|
| | | High | Medium | Low |
| Frequency domain density | High | 0.0% | 12.1% | 18.1% |
| | Medium | 3.4% | 13.8% | 19.0% |
| | Low | 6.9% | 15.5% | 19.8% |

Pilot density may be adaptive only in the frequency domain, only in the time domain, or in both time and frequency domains. Pilot density may be communicated between a communication controller and a user equipment in a number of ways. In one example, the communication controller determines the pilot density and transmits the pilot density to the user equipment at every starting time of a transmission. In another example, the user equipment determines the pilot density and transmits the pilot density to the communication controller at every starting time of a transmission. Alternatively, the communication controller and the user equipment share the same decision procedure based on a set of pre-defined pilot configurations. The communication controller and the user equipment may independently execute the procedure, where signaling does not happen at every starting time of a transmission. In one embodiment, the pilot density is determined based on a tree structure. In another embodiment, the pilot density may be determined using a look-up table (LUT). The network and the communication controllers may determine the pilot density by sharing a common decision procedure without frequent signaling or feedback overhead. In an example, the communication controller and the user equipment both independently determine the pilot density without signaling the pilot density. Either the communication controller or the user equipment may initially set the procedure used to determine the pilot density, and transmit this procedure initially. After the communication controller and the user equipment have this procedure, they can both independently determine the pilot density based on the same characteristics and have the same resulting pilot density. The communication controller and the user equipment may transmit the characteristics used in determining the pilot density.

Figure 4:
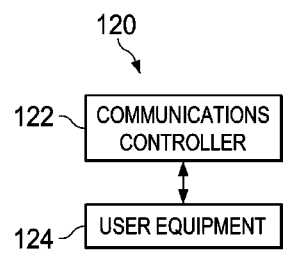
FIG. 4 illustrates an embodiment system for determining a pilot signal arrangement.

FIG. 4 illustrates system 120 for adaptively determining a pilot density. System 120 includes user equipment 122 and communication controller 124. User equipment 122 transmits messages to communication controller 124, and communication controller 124 sends messages to user equipment 122 to exchange characteristics that may be used to determine the pilot density. Factors used by system 120 in determining the pilot density include network factors, user equipment factors, and environmental factors. Network factors include one or more of the transmission type, the user equipment's assigned resource block (RB) size, the modulation and coding scheme (MCS) level, and the user equipment's assigned TTI length. User equipment factors include the user equipment's mobility and the user equipment's channel estimation capability. Factors that affect the user equipment's channel estimation capability include the number of user equipment antennas and the channel estimation algorithm used by the user equipment. Environmental factors include the channel delay spread.

Figure 5:
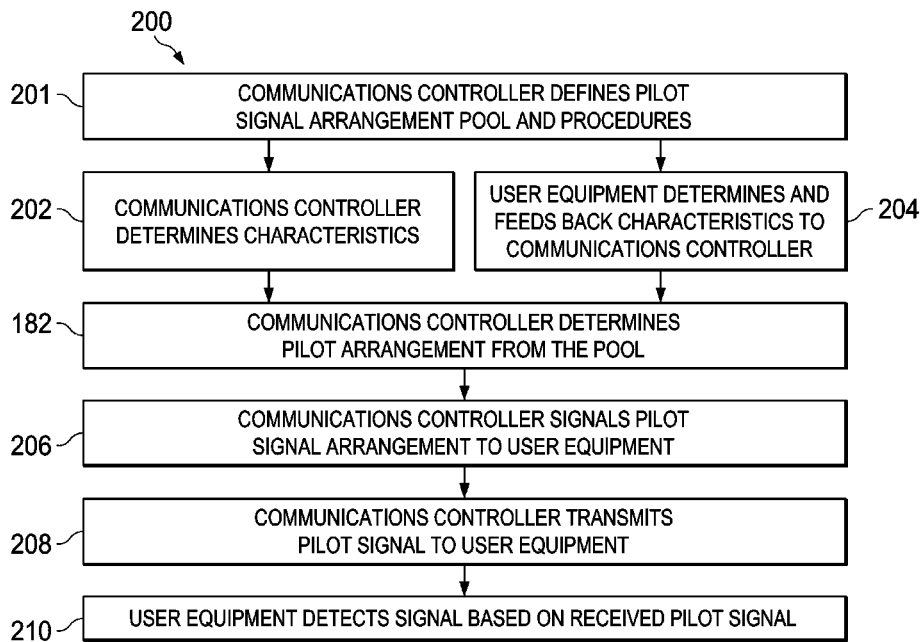
FIG. 5 illustrates an embodiment method of determining a pilot signal arrangement.

FIG. 5 illustrates flowchart 200 showing a method of adaptively determining a pilot signal arrangement by a communications controller. Initially, in step 201, a pilot signal arrangement pool and procedures are defined by a communications controller. For example, the pilot signal arrangement pool might include a high pilot density arrangement, a medium pilot density arrangement, and a low pilot density arrangement in the time domain, in the frequency domain, or in both the time domain and the frequency domain. The pilot signal arrangement procedure may be a look-up table (LUT) or a tree decision structure. The procedures use a set of characteristics to determine pilot densities. This set of characteristics can be divided into a first subset of characteristics, whose values are determined by the user equipment, and a second subset of characteristics, whose values are determined by the communication controller. Then, the communications controller determines the values of the second subset of characteristics in step 202. In step 204, the user equipment may determine and feed back the values of the first subset of characteristics to the communication controller. Next, in step 182, the communication controller determines the pilot signal arrangement from the pilot signal arrangement pool using the pilot signal arrangement procedure and the characteristics. After determining the pilot signal arrangement, the communications controller signals the pilot signal arrangement to the user equipment in step 206. Then, in step 208, the communications controller transmits the pilot signal to the user equipment. Finally, in step 210, the user equipment detects a signal based on the pilot signal received from the user equipment.

Figure 6:
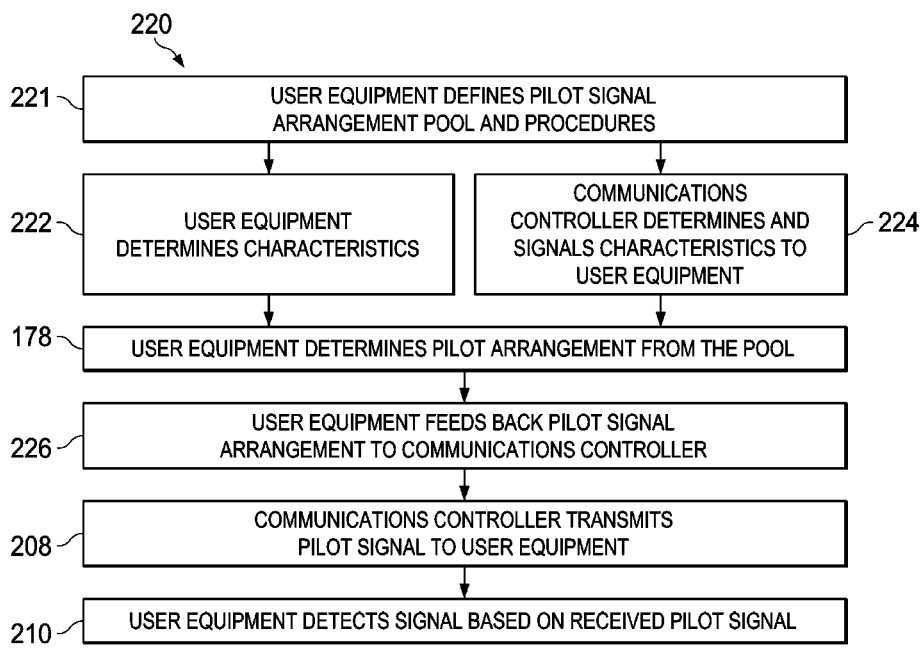
FIG. 6 illustrates another embodiment method of determining a pilot signal arrangement.

FIG. 6 illustrates flowchart 220 for a method of adaptively determining a pilot signal arrangement by a user equipment. Initially, in step 221, the user equipment defines the pilot signal arrangement pool and procedure. Then, in step 222, the user equipment determines the values of a first subset of characteristics to be used by the pilot signal procedure. The communications controller may determine and signal the values of a second subset of characteristics to the user equipment. Next, in step 178, the user equipment determines the pilot signal arrangement from the pilot signal arrangement pool using the pilot signal arrangement procedure and the characteristics. After determining the pilot signal arrangement, the user equipment feeds back the pilot signal arrangement to the communications controller in step 226. Then, in step 208, the communications controller transmits a pilot signal to the user equipment. Finally, in step 210, the user equipment detects a signal based on the received pilot signal.

Figure 7:
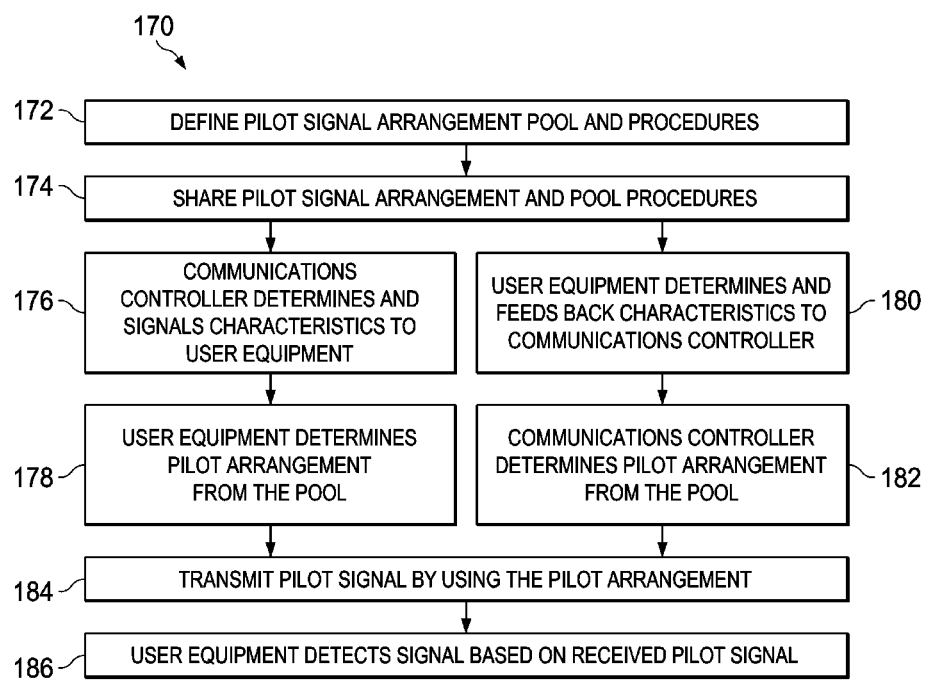
FIG. 7 illustrates an additional method of determining a pilot signal arrangement

FIG. 7 illustrates flowchart 170 depicting a method of adaptively determining a pilot signal arrangement. Initially, in step 172, pilot signal arrangement pool and procedures are defined. This may be done by a communication controller, a user equipment, or both. The pilot signal procedures define how a pilot signal arrangement is selected from a set of pilot signal arrangement pool. For example, the pilot signal arrangement pool may include a high density arrangement, a medium density arrangement, and a low density arrangement in both the frequency domain and the time domain. Then, in step 174, the node that defined the pilot signal arrangements and procedures shares the pilot signal arrangement pool and procedures with other nodes. For example, if a user equipment defined the pilot signal arrangement pool and procedures, the user equipment transmits them to the communication controller. However, if a communication controller developed the pilot signal arrangement pool and procedures, the communication controller transmits them to the user equipment.

Then, in step 176, the communication controller determines and signals characteristics to the user equipment, and in step 178, the user equipment determines the pilot signal arrangement based on the pilot signal arrangement pool, the pilot signal arrangement procedure, and characteristics. Also, in step 180, the user equipment determines and feeds back characteristics to the communication controller. Next, in step 182, the communication controller determines the pilot arrangement based on the characteristics, and the pilot signal arrangement pool and procedures. Hence, the communication controller and user equipment may determine the same pilot signal arrangement without directly communicating the pilot signal arrangement at every starting time of transmission, because they use the same pilot signal arrangement procedures, pilot signal arrangement pool, and characteristics without directly communicating the pilot signal arrangement. In one example, only one of step 176 and step 180 are performed. Alternatively, both step 176 and step 180 are performed. Then, in step 184, the communication controller transmits the pilot signal arrangement to the user equipment. Finally, in step 186, the user equipment detects a signal based on the received pilot signal.

Figure 8:
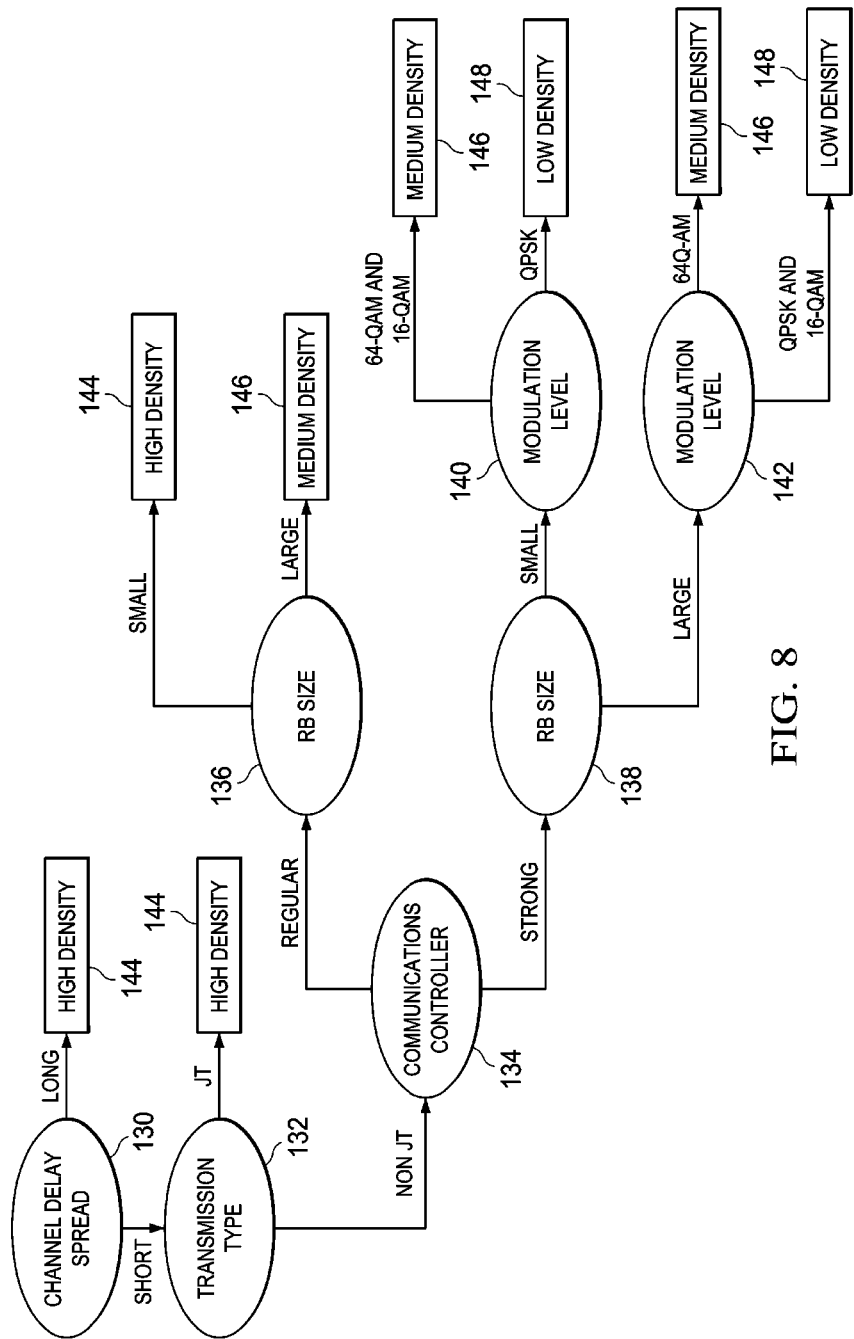
FIG. 8 illustrates a flowchart for an embodiment method of determining a pilot signal arrangement.

In one embodiment, the frequency domain pilot density is determined based on the channel delay spread, the transmission type, the communication controller capability, the RB size, and the MCS level. The frequency domain pilot density may be determined using a tree structure. Alternatively, the frequency domain pilot density may be determined using a LUT. FIG. 8 illustrates a tree structure that can be used to determine the pilot density in the frequency domain. Alternatively, other decision trees or LUTs may be used. Initially, in step 130, the channel delay spread is determined. When the channel delay spread is long, for example with a root mean square (RMS) of greater than 7 μs, high pilot density 144 is used. However, when the channel delay spread is short, for example with an RMS value of less than or equal to 7 μs, the transmission type is further evaluated in step 132. In step 132, when the transmission type is joint transmission (JT), high pilot density 144 is used, and when the transmission type is not JT transmission, the communication controller capability is further evaluated in step 134. Then, in step 134, when the communication controller capability is regular, RB size is further evaluated in step 136. If the RB size is determined to be small in step 136, for example if the RB size is less than or equal to five RBs, high pilot density 144 is used. However, if the RB size is determined to be large in step 136, for example if the RB size is greater than five RBs, medium pilot density 146 is used. When the communication controller capability determined in step 134 is strong, the RB size is determined in step 138. When the RB size is determined to be small in step 138, the MCS level is evaluated in step 140, and when the RB size is determined to be large in step 138, the MCS level is evaluate in step 142. In step 140, if the MCS level in 64-QAM or 16-QAM, medium pilot density 146 is used, while if the MCS level is QPSK, low pilot density 148 is used. However, in step 142, if the MCS level is 64-QAM, medium pilot density 146 is used, while if the MCS level is QPSK or 16-QAM, low pilot density 148 is used.

Alternatively, the time domain pilot density may be determined using a LUT. FIG. 9 illustrates a table 150 illustrating a LUT used to determine the time domain pilot density. However, other LUTs or a tree structures may be used to determine the time domain pilot density. When the user equipment's mobility is low and the TTI length is long, a low pilot density is used. For example, a low mobility user equipment may be fixed or nomadic, moving at a speed of less than 30 km/hour. A high mobility user equipment may be moving at a speed of greater than or equal to 30 km/hour. In an example, a long TTI length includes 56 OFDM symbols, a medium TTI length includes 28 OFDM symbols, and a short TTI length includes 14 OFDM symbols. When the user equipment mobility is low and the TTI length is medium or short, a medium pilot density is used. Also, when the user equipment mobility is high and the TTI length is long, a medium pilot density is used. However, when the user equipment mobility is high and the TTI length is medium or short, a high pilot density is used.

In an example, when a user equipment enters a network, it transmits its channel estimation capability to the network. At every data transmission, after the network determines the MCS level and RB size, the communication controller may determine the pilot density. After the user equipment knows the MCS level and RB size, for example from the physical downlink control channel (PDCCH), the user equipment may determine the pilot density. In addition, explicit signaling information, such as a transmission mode, may be used to help the density decision. The user equipment may demodulate data based on the pilot density.

A user equipment may be aware that it will potentially be served by joint transmission. To enable joint transmission, a user equipment's feedback has a special mode, for example based on user equipment feedback and an inter-communications controller feedback. Once a joint transmission mode is configured by the network, the communications controller knows that it will potentially be served by joint transmission.

A channel delay spread is mainly determined by the environment around the communication controller. User equipments in the vicinity of the communication controller have similar channel delay spreads. A communication controller may estimate the common channel delay spread by averaging the channel delay spread from all neighboring user equipment. For example, a communication controller may estimate the channel delay spread based on the cyclic prefix (CP) of the user equipment's uplink signal. Based on the uplink signals from all user equipments received by one communication controller, the communication controller may estimate the channel delay spread and determine its category. A communication controller can accumulate the upload signals of many user equipments to average channel randomness and obtain a good channel delay spread estimation. After estimation, the channel delay spread can be stored in the communication controller. The channel delay spread may be updated as needed.

A user equipment's channel estimation capability may be categorized as regular or strong. A user equipment may determine its own capability based on a standard method or metric, for example based on the signal to noise ratio (SNR) loss due to channel estimation.

The user equipment's mobility and TTI length affect the pilot density in the time domain. When a user equipment has a low mobility, the communication controller can reduce the pilot density in the time domain. When a user equipment has a low mobility, its channel varies slowly in time, and the pilot density in the time domain can be reduced. With a long TTI length, good channel estimation is still achieved by time interpolation even with a lower pilot density. However, with a short TTI length, the same reduction can be made, because a user equipment can store the received signals of several past TTIs. If several consecutive TTIs are given to one user equipment, using pilots of the past TTIs, the user equipment may perform interpolation to assist in channel estimation. FIG. 10 illustrates diagram 160 showing stored pilot signals from past TTIs that may be used for time interpolation.

FIG. 11 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, communication controllers, user equipments, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more communication controllers/transmit antennas and one or more user equipments/receive antennas. In an embodiment, the processing unit is coupled to a local-area network or a wide-area network for data processing and communications with remote devices, such as other processing units, the Internet, remote storage facilities, or the like.

Advantages of an embodiment include using adaptive pilot density to reduce overhead and exploit the diversity of communication controllers. In an embodiment, the network and communication controllers determine the pilot density by sharing a common decision procedure without frequent signaling or feedback overhead. An advantage of an embodiment includes the reduction of signaling and/or feedback overhead.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
    transmitting, by a base station, a pilot configuration indicating a pilot signal arrangement, the pilot signal arrangement having been selected from a set of pre-defined pilot signal arrangements according to at least one of a transmission time interval (TTI) length, a mobility of a user equipment (UE), or a modulation and coding scheme (MCS) level over which the UE transmits or receives wireless signals,
    the pilot signal arrangement having a time domain pilot density defined by a number of pilot symbols of the pilot signal arrangement used within the TTI length, and the time domain pilot density depending on the MCS level; and
    communicating, by the base station with the UE, using a pilot signal according to the pilot signal arrangement,
    wherein the time domain pilot density of the pilot signal arrangement is a function of the TTI length.

2. The method of claim 1, wherein the set of pre-defined pilot signal arrangements includes a frequency domain pilot signal arrangement.

3. The method of claim 2, wherein the frequency domain pilot signal arrangement is associated with a channel delay spread characteristic.

4. The method of claim 1, wherein the time domain pilot density of the pilot signal arrangement is associated with a symbol duration of a transmission communicated over time-frequency resources allocated to the UE.

5. The method of claim 1, wherein the time domain pilot density of the pilot signal arrangement is associated with a channel estimation capability of the UE.

6. A method comprising:
    receiving, by a user equipment (UE) from a base station, a pilot configuration indicating a pilot signal arrangement, the pilot signal arrangement having been selected from a set of pre-defined pilot signal arrangements according to at least one of a transmission time interval (TTI) length, a mobility of the UE, or a modulation and coding scheme (MCS) level over which the UE transmits or receives wireless signals,
    the pilot signal arrangement having a time domain pilot density defined by a number of pilot symbols of the pilot signal arrangement used within the TTI length, and the time domain pilot density depending on the MCS level; and
    communicating, by the UE with the base station, using a pilot signal according to the pilot signal arrangement,
    wherein the time domain pilot density of the pilot signal arrangement is a function of the TTI length.

7. The method of claim 6, wherein the set of pre-defined pilot signal arrangements includes a frequency domain pilot signal arrangement.

8. The method of claim 7, wherein the frequency domain pilot signal arrangement is associated with a channel delay spread characteristic.

9. The method of claim 6, wherein the time domain pilot density of the pilot signal arrangement is associated with a symbol duration of a transmission communicated over time-frequency resources allocated to the UE.

10. The method of claim 6, wherein the time domain pilot density of the pilot signal arrangement is associated with a channel estimation capability of the UE.

11. A base station comprising:
    a processor; and
    a non-transitory computer readable storage medium storing programming for execution by the processor, the programming including instructions to:
        transmit a pilot configuration indicating a pilot signal arrangement, the pilot signal arrangement having been selected from a set of pre-defined pilot signal arrangements according to at least one of a transmission time interval (TTI) length, a mobility of a user equipment (UE), or a modulation and coding scheme (MCS) level over which the UE transmits or receives wireless signals,
        the pilot signal arrangement having a time domain pilot density defined by a number of pilot symbols of the pilot signal arrangement used within the TTI length, and the time domain pilot density depending on the MCS level; and
        communicate, with the UE, using a pilot signal according to the pilot signal arrangement,
        wherein the time domain pilot density of the pilot signal arrangement is a function of the TTI length.

12. The base station of claim 11, wherein the set of pre-defined pilot signal arrangements includes a frequency domain pilot signal arrangement.

13. The base station of claim 12, wherein the frequency domain pilot signal arrangement is associated with a channel delay spread characteristic.

14. The base station of claim 11, wherein the time domain pilot density of the pilot signal arrangement is associated with a symbol duration of a transmission communicated over time-frequency resources allocated to the UE.

15. The base station of claim 11, wherein the time domain pilot density of the pilot signal arrangement is associated with a channel estimation capability of the UE.

16. A User Equipment (UE) comprising:
    a processor; and
    a non-transitory computer readable storage medium storing programming for execution by the processor, the programming including instructions to:
        receive, from a base station, a pilot configuration indicating a pilot signal arrangement, the pilot signal arrangement having been selected from a set of pre-defined pilot signal arrangements according to at least one of a transmission time interval (TTI) length, a mobility of the UE, or a modulation and coding scheme (MCS) level over which the UE transmits or receives wireless signals,
        the pilot signal arrangement having a time domain pilot density defined by a number of pilot symbols of the pilot signal arrangement used within the TTI length, and the time domain pilot density depending on the MCS level; and communicate, with the base station, using a pilot signal according to the pilot signal arrangement, wherein the time domain pilot density of the pilot signal arrangement is a function of the TTI length.

17. The UE of claim 16, wherein the set of pre-defined pilot signal arrangements includes a frequency domain pilot signal arrangement.

18. The UE of claim 17, wherein the frequency domain pilot signal arrangement is associated with a channel delay spread characteristic.

19. The UE of claim 16, wherein the time domain pilot density of the pilot signal arrangement is associated with a symbol duration of a transmission communicated over time-frequency resources allocated to the UE.

20. The UE of claim 16, wherein the time domain pilot density of the pilot signal arrangement is associated with a channel estimation capability of the UE.

* * * * *